Patented Dec. 15, 1936

2,064,727

UNITED STATES PATENT OFFICE 2,064,727

PROCESS FOR THE MANUFACTURE OF STABLE PREPARATIONS HAVING A HIGH CONTENT OF COMMERCIAL LECITHIN

Carl Heinz Buer, Cologne-Marienburg, Germany

No Drawing. Application February 26, 1936, Serial No. 65,920. In Germany May 2, 1931

6 Claims. (Cl. 167—82)

As is well known high percentage commercial lecithin is of a salve-like highly sticky consistency, which greatly hinders the use of lecithin in original substance for therapeutic purposes. In the trade, pure lecithin in original substance has hitherto been packed and stored only in closed airtight containers, such as small porcelain or glass jars or pots, but, owing to the sticky, wax-like consistency of the lecithin, this form of packing makes it almost impossible to measure out accurate single doses, such as are necessary for therapeutic purposes. For the therapeutic use, however, small portions or bodies of lecithin, accurately divided off, are necessary. Owing to the highly unctuous and sticky properties of the lecithin it has not hitherto been possible, with the aid of mechanical appliances, to produce from high percentage commercial lecithin in original substance, small nonsticky lecithin bodies which can be packed. On the contrary, the only method practised in dosing out the pure substance has been to measure it out by hand into gelatine capsules. This method of dosage, however, is not very appropriate, neither does it possess any advantages. The gelatine capsules, of course, have to be swallowed and this circumstance, alone, makes it difficult, or even impossible in many cases, for patients to take the substance. Again, hand filling of the capsules is inaccurate and troublesome while at the same time the use of gelatine capsules substantially increases the cost of the marketed product.

For therapeutic purposes, therefore, lecithin has hitherto been mainly used in admixture with other substances and, in order to make mechanical handling of the lecithin and the production therefrom of small accurately measured lecithin-containing bodies possible, it has been mixed with from 70% to 95% of mainly pulverulent and non-sticky substances. In this way kneadable but non-sticky masses are obtained, which can subsequently be worked up, by suitable mechanical appliances, into pills, pastilles, drops or tablets. These methods of dosage, however, have the disadvantage that considerable quantities of ballast materials have to be used to work up a comparatively small quantity of lecithin. Furmore, the pills, tablets and drops manufactured in this way contain only a small amount of high percentage commercial lecithin. Thus, in order to administer several grams of lecithin to the body, a comparatively large number of pills, tablets or drops have to be taken when the substance is dosed in this way. Another disadvantage is that, owing to the considerable admixtures, the quality of the lecithin used cannot be very reliably estimated.

It has now been found that high percentage commercial lecithin in original substance can be worked up, with the aid of mechanical appliances and without the admixture of other and non-sticky substances into small uniformly dosed non-sticky and stable lecithin bodies. For this purpose thorough drying of the high percentage commercial lecithin is the first necessity. As is well known, the lecithin of commerce always contains a comparatively large amount of moisture. In the usual method of obtaining lecithin drying is generally carried out in an apparatus of comparatively large capacity. Owing to the strongly hygroscopic properties of lecithin it cannot be brought to a substantially anhydrous condition by the usual method of drying it in a comparatively thick layer. Tests on commercial lecithin dried in this way show an average water content of from 4% to 6%. It is to this moisture content that the highly sticky properties of the high percentage lecithin of commerce are to be ascribed and this is why the product of the known method of dehydration cannot be worked up mechanically into pills and the like.

In the process of the present invention, therefore, the lecithin is dried to an extraordinarily high degree, in suitable drying apparatus, either under vacuum or otherwise. This very thorough drying is rendered possible by applying the lecithin to drying plates in very thin layers, say, about 1 to 2 mm. thick. By this expedient the water content of the lecithin can be reduced to 1% or less. Lecithin dried in this way is almost anhydrous and has a solid, almost mealy structure, so that it no longer possesses the plastic, kneadable consistency necessary for mechanical treatment. Now it has been found that this almost anhydrous lecithin can be restored to a plastic, kneadable consistency very conveniently by the addition of a small quantity of alcohol, say, from 5% to 6%. However, in contradistinction to lecithin which contains water, lecithin which has been rendered plastic by this small addition of alcohol no longer possesses the disadvantageous sticky properties hereinbefore referred to. It can, therefore, be divided up just as it is, by means of mechanical appliances, into uniform lecithin bodies, without even soiling the mechanical parts. In this way balls, small sticks or tablets can be formed from the lecithin treated in the manner described.

Owing, however, to the strongly hygroscopic properties of lecithin the bodies produced from it in this way and put into storage would, in a very short time, take up moisture again from the air and, consequently, would stick together. This absorption of water would also strongly prejudice the keeping qualities of the lecithin bodies if stored for any considerable length of time. It has been found that these disadvantages can be avoided by covering the mechanically formed lecithin bodies, preferably immediately after their production, with a thin coating of some known water-repelling medium of as high a melting point as possible (e. g. refined beeswax, palmitin, stearin or a similar substance) at a temperature of 40° to 50° C. the lecithin bodies being dipped by suitable appliances into the melted coating substances and then allowed to cool rapidly. It has been found that a completely enveloping coating of the water repelling medium can be obtained on the lecithin bodies if the latter be coated immediately after the lecithin has been dried practically to the anhydrous state and divided up into doses or small bodies. If these lecithin bodies be allowed to absorb only a few per cent of water again, a completely enveloping coating of water repelling medium can no longer be obtained.

The coating of the lecithin bodies makes them airtight on the surface so that, even if they are stored for a long time, no trace of moisture from the air can penetrate into them. Thus, after the coating treatment they can be mechanically wrapped in paper and packed in boxes, as they remain perfectly dry on the outside and have sufficient strength imparted to them by the thin covering layer. Furthermore, the slight addition of alcohol in conjunction with the airtight covering of the lecithin bodies definitely prevents deterioration of the lecithin, even when the bodies are stored for a very long time. It is well known that when alcohol is used as a preservative for organic substances an addition of at least 15% of alcohol is required; with smaller additions of alcohol the preservation of such substances is not adequately ensured. It has, however, been found that, by combining the action of the airtight coating on the lecithin bodies with the simultaneous use of alcohol, reliable preservation of the lecithin can be obtained with an addition of only 5% of alcohol. This discovery is of special importance because, for many therapeutic uses of lecithin a relatively high alcohol content would be most undesirable.

Another advantage of the new method of dosing and preserving lecithin resides in the use of mechanical dosing and packing means instead of performing these operations manually. This is particularly important from a hygienic standpoint, in view of the therapeutic uses to which the substance is put. Finally, the method is considerably cheaper and more simple than measuring out the lecithin into gelatine capsules or working it up with large quantities of added substances for the purpose of producing pills, pastilles, drops or tablets.

What I claim is:—

1. Process of producing stable formed bodies of substantially pure commercial lecithin, consisting in drying the lecithin in thin layers to a moisture content of not over 1%, adding a small quantity of alcohol to the lecithin so dried, immediately dividing and forming the lecithin into bodies of predetermined dosage and applying a superficial coating of a water repelling substance to said bodies.

2. Process of producing stable formed bodies of substantially pure commercial lecithin, consisting in drying the lecithin in thin layers to a moisture content of not over 1%, adding to the lecithin so dried a quantity of alcohol substantially less than that normally required to ensure sustained preservation of organic substances, dividing and forming the lecithin with the alcohol addition into small bodies of predetermined dosage and applying to such bodies a superficial airtight and water-repellant coating.

3. Process according to claim 1, in which the thickness of the layers of lecithin being dried is from 1 to 2 mm.

4. Process according to claim 1, and in which the quantity of alcohol added is 5 to 6% of the dried lecithin.

5. Process according to claim 1, and in which the superficial coating of the lecithin bodies is effected by dipping the bodies in a melt of water-repelling substance having a melting point of about 40 to 60° C.

6. Process of making stable preparations of substantially pure lecithin, consisting in reducing the moisture content of the lecithin to about 1%, adding to the dried lecithin alcohol in a proportion sufficient to render it plastic but insufficient for its sustained preservation, dividing and forming the plastic lecithin into bodies of predetermined dosage and completely enveloping each of the said bodies in an airtight covering of water-repellant material the production and coating of the individual bodies being effected before the lecithin mixed with alcohol has time to absorb any appreciable moisture from the atmosphere.

CARL HEINZ BUER.